United States Patent
Nemoto

(10) Patent No.: US 6,631,895 B2
(45) Date of Patent: Oct. 14, 2003

(54) METHOD FOR CONTROLLING DRIVE OF ACTUATOR OF ACTIVE VIBRATION ISOLATION SUPPORT SYSTEM

(75) Inventor: Hirotomi Nemoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/999,039

(22) Filed: Oct. 31, 2001

(65) Prior Publication Data

US 2002/0079631 A1 Jun. 27, 2002

(30) Foreign Application Priority Data

Nov. 6, 2000 (JP) ........................................ 2000-337788

(51) Int. Cl.$^7$ .............................. F16F 15/00; F16M 5/00
(52) U.S. Cl. ............................... 267/140.14; 267/140.15
(58) Field of Search ....................... 267/140.15, 140.14, 267/219, 136; 248/550, 636, 562, 638; 188/378; 180/300, 312, 902; 280/5.516, 5.52; 701/37, 38; 700/28; 318/623, 649, 460, 114

(56) References Cited

U.S. PATENT DOCUMENTS

| | | | | |
|---|---|---|---|---|
| 5,647,579 A | * | 7/1997 | Satoh ..................... | 267/140.14 |
| 5,905,317 A | * | 5/1999 | Aoki | |
| 6,120,012 A | * | 9/2000 | Shibata et al. | |
| 6,254,069 B1 | * | 7/2001 | Muramatsu et al. ... | 267/140.14 |
| 6,422,546 B1 | * | 7/2002 | Nemoto et al. | |
| 2003/0030203 A1 | * | 2/2003 | Nemoto .................. | 267/140.14 |

* cited by examiner

Primary Examiner—Douglas C. Butler
(74) Attorney, Agent, or Firm—Carrier, Blackman & Associates, P.C.; Joseph P. Carrier; William D. Blackman

(57) ABSTRACT

A method for controlling drive of an actuator of an active vibration isolation support system allows the waveform of the lift of the actuator to be freely set, while avoiding the generation of heat in the actuator driver and a corresponding increase in the power consumption. Specifically, duty control of the voltage that is applied to the actuator is carried out in each of a large number of consecutive micro time regions such that the waveform of the lift of the actuator can be set freely, and by varying the number of consecutive micro time regions whose duty ratios change with a fixed pattern, the period over which the lift of the actuator changes can be set freely. Moreover, since electrical energy is not wasted as thermal energy in the actuator driver, the problems of heat being generated in the driver and increased power consumption can be avoided.

12 Claims, 6 Drawing Sheets

METHOD FOR CONTROLLING DRIVE OF ACTUATOR OF ACTIVE VIBRATION ISOLATION SUPPORT SYSTEM

BACKGROUND OF THE INVENTION

1. Field of the Invention

The present invention relates to a method for controlling the drive of an actuator of an active vibration isolation support system that includes an elastic body receiving a load from a vibrating body, a liquid chamber having a wall of which at least a part is formed by the elastic body, a movable member for changing the capacity of the liquid chamber, and an electromagnetic actuator for driving the movable member.

2. Description of the Relevant Art

Such an active vibration isolation support system is known and disclosed in Japanese Patent Application Laid-open No. 10-110771.

This active vibration isolation support system calculates a fixed period drive signal based on a reference signal that is output every time a crankshaft rotates through a fixed angle and a residual vibration signal that is transmitted from an engine to a vehicle body frame via the active vibration isolation support system, and feedforward control of the actuator is carried out based on this drive signal.

Conventionally, as shown in FIG. 6, in the case where the amount of lift of the actuator of the active vibration isolation support system is controlled so as to change with a sinusoidal wave form having a fixed period, a proportion of a constant voltage that is supplied to the actuator driver is regulated so as to be converted into thermal energy, and the remainder of the voltage is applied to the actuator thus giving a current with a sinusoidal wave form.

However, if the above-mentioned method is adopted not only is there the problem that the actuator driver generates heat thus requiring cooling, but there is also the problem that a proportion of the electrical energy is wasted as thermal energy in the driver thus increasing power consumption.

SUMMARY OF THE INVENTION

The present invention has been conducted under the above-mentioned circumstances, and it is an object of the present invention to allow the waveform and the period of the lift of an actuator of an active vibration isolation support system to be freely controlled while avoiding the generation of heat in the actuator driver and the corresponding increase in the power consumption.

In order to achieve the above-mentioned object, in accordance with the invention according to a first aspect and feature of the invention, there is provided a method for controlling the drive of an actuator of an active vibration isolation support system that includes an elastic body receiving a load from a vibrating body, a liquid chamber having a wall of which at least a part is formed by the elastic body, a movable member which changes a capacity of the liquid chamber, and an electromagnetic actuator which drives the movable member, the method comprising the steps of setting a large number of consecutive micro time regions, carrying out duty control of voltage that is applied to the actuator in each of the micro time regions, and setting, via a fixed number of consecutive micro time regions in which changes of duty ratio form a defined pattern, a period of a current that drives the actuator.

In accordance with the above-mentioned arrangement, by carrying out duty control of the voltage that is applied to the actuator individually in each of the large number of consecutive micro time regions, the waveform of a current that is applied to the actuator, that is to say, the waveform of the lift of the actuator can be set freely and, moreover, by changing the number of consecutive micro time regions in which changes of the duty ratio form a defined pattern, the period of the current that drives the actuator, that is to say, the period of the lift of the actuator can be set freely. Furthermore, since electrical energy is not wasted as thermal energy in the actuator driver, the problems of heat being generated in the driver and the power consumption increasing can be avoided.

An engine E of an embodiment corresponds to the vibrating body of the present invention, a first elastic body 14 of the embodiment corresponds to the elastic body of the present invention, and a first liquid chamber 24 of the embodiment corresponds to the liquid chamber of the present invention.

DETAILED DESCRIPTION OF THE INVENTION

Figure 1:
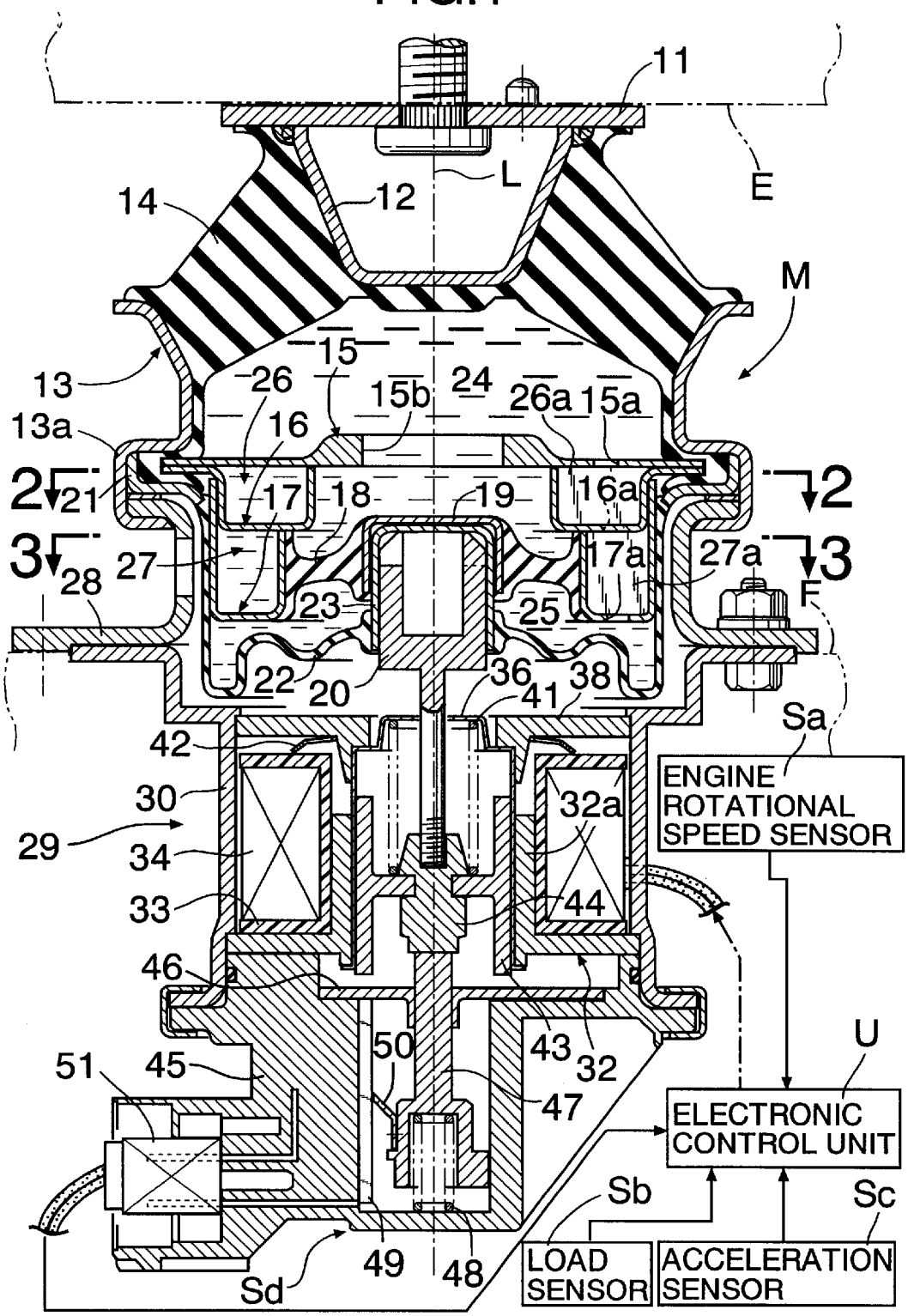
FIG. 1 is a longitudinal cross sectional view of an active vibration isolation support system which may be used according to the present invention.

Modes for carrying out the present invention are explained below by reference to an embodiment of the present invention illustrated in the appended drawings. Specifically, FIGS. 1 to 5 illustrate one embodiment of the present invention.

An active vibration isolation support system M shown in FIGS. 1 to 4 is for elastically supporting an engine E of an automobile in a vehicle body frame F. It is controlled by an electronic control unit U to which are connected an engine rotational speed sensor Sa for detecting the engine rotational speed, a load sensor Sb for detecting the load that is input to the active vibration isolation support system M, an acceleration sensor Sc for detecting the acceleration acting on the engine E, and a lift sensor Sd for detecting the amount of lift of a movable member 20 of the actuator 29, which will be described below.

The active vibration isolation support system M has a structure that is substantially symmetrical with respect to an axis L. It includes an inner tube 12 that is welded to a plate-shaped mounting bracket 11 that is joined to the engine E and an outer tube 13 that is placed coaxially around the inner tube 12. The inner tube 12 and the outer tube 13 are bonded by vulcanization bonding to the upper end and lower end respectively of a first elastic body 14 made of a thick rubber. A disc-shaped first orifice-forming member 15 having an aperture 15b in its center, an annular second orifice-forming member 16 having a U-shaped cross section open at the top, and a third orifice-forming member 17 similarly having a U-shaped cross section open at the top are welded into a single unit. The outer peripheries of the first orifice-forming member 15 and the second orifice-forming member 16 are superimposed and fixed to a caulking fixing part 13a provided in a lower part of the outer tube 13.

The outer periphery of a second elastic body 18 made of a rubber membrane is fixed by vulcanization bonding to the inner periphery of the third orifice-forming member 17. A cap 19 that is fixed by vulcanization bonding to the inner periphery of the second elastic body 18 is press-fitted and fixed onto a movable member 20 that is disposed on the axis L in a vertically movable manner. A ring 21 is fixed to the caulking fixing part 13a of the outer tube 13, the outer periphery of a diaphragm 22 is fixed to the ring 21 by vulcanization bonding, and a cap 23 that is fixed by vulcanization bonding to the inner periphery of the diaphragm 22 is press-fitted and fixed onto the movable member 20.

Between the first elastic body 14 and the second elastic body 18 is thus defined a first liquid chamber 24, which is filled with a liquid. Between the second elastic body 18 and the diaphragm 22 is thus defined a second liquid chamber 25, which is filled with a liquid. The first liquid chamber 24 and the second liquid chamber 25 communicate with each other via an upper orifice 26 and a lower orifice 27 that are formed from the first to third orifice-forming members 15, 16 and 17.

Figure 2:
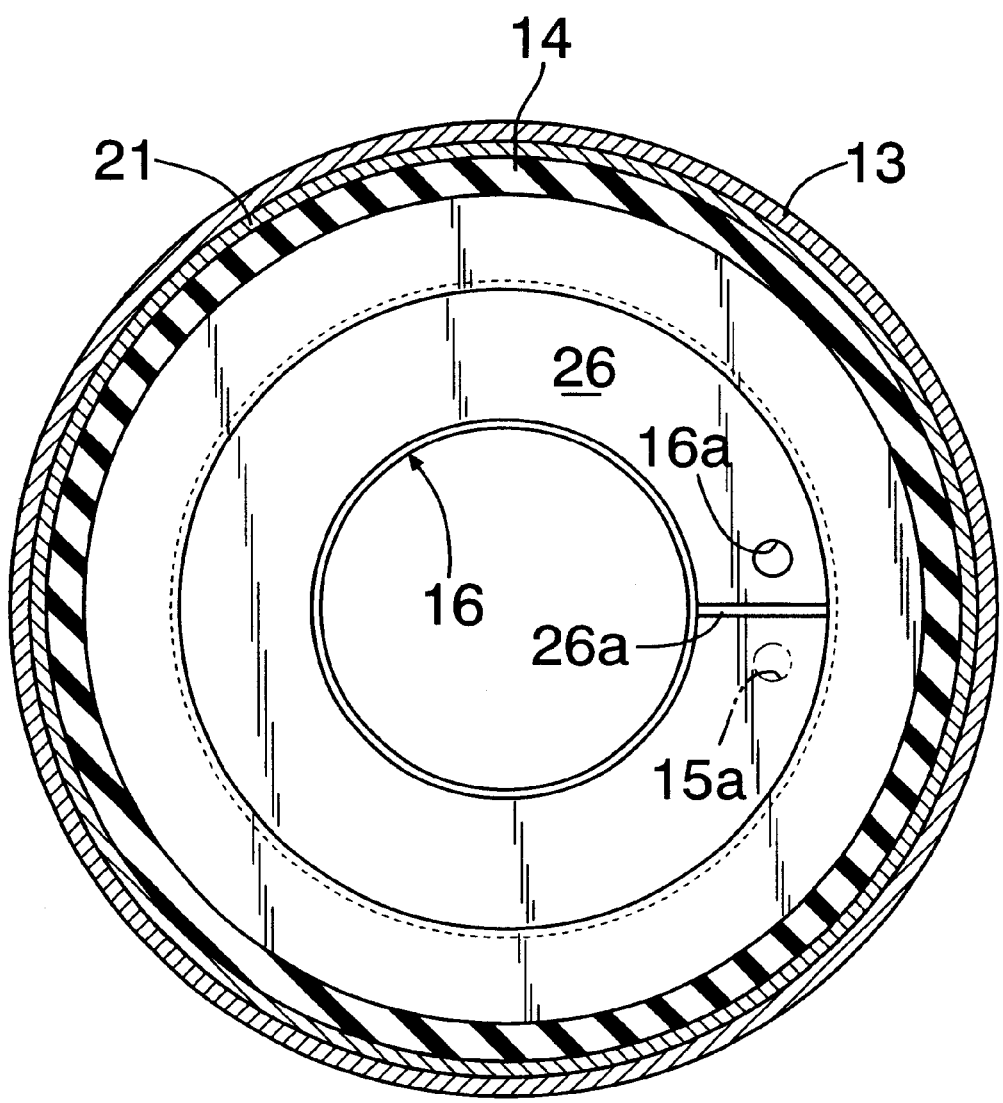
FIG. 2 is a cross sectional view looking down at line 2—2 of FIG. 1.

The upper orifice 26 is an annular passage formed between the first orifice-forming member 15 and the second orifice-forming member 16. A through hole 15a is formed in the first orifice-forming member 15 on one side of a partition 26a provided in a part of the upper orifice 26, and a through hole 16a is formed in the second orifice-forming member 16 on the other side of the partition 26a. The upper orifice 26 is therefore formed along an almost complete circumference from the through hole 15a of the first orifice-forming member 15 to the through hole 16a of the second orifice-forming member 16 (FIG. 2).

Figure 3:
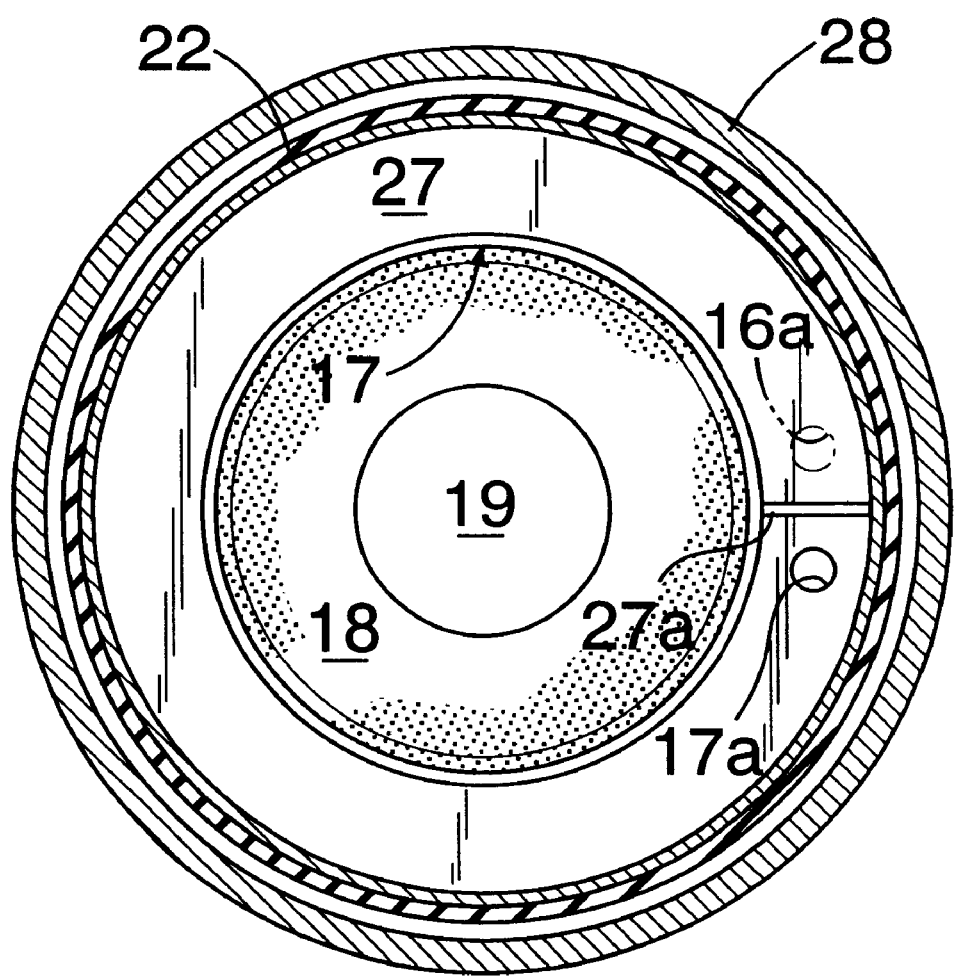
FIG. 3 is a cross sectional view looking down at line 3—3 in FIG. 1.
Figure 4:
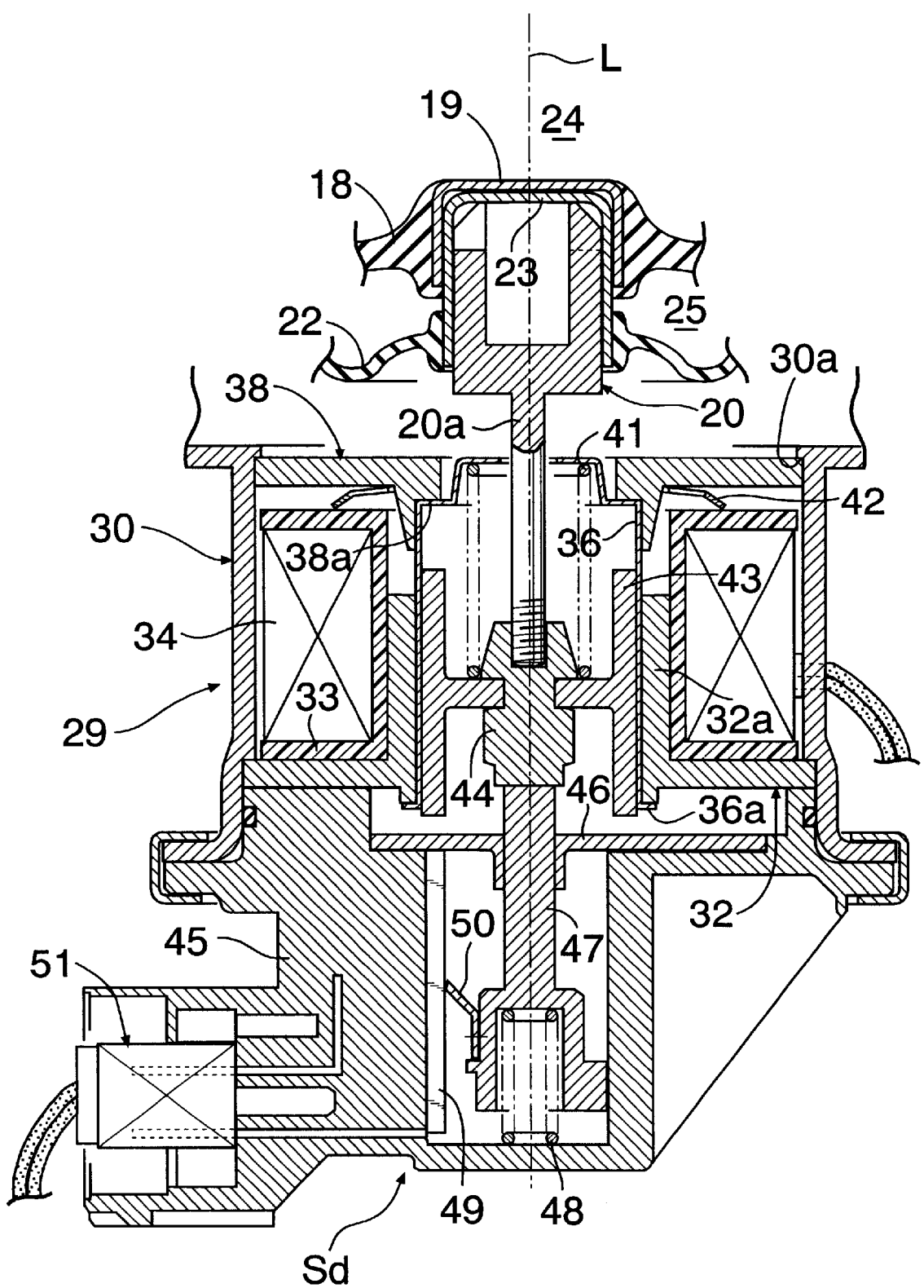
FIG. 4 is a magnified view of an essential, lower half part of FIG. 1.

The lower orifice 27 is an annular passage formed between the second orifice-forming member 16 and the third orifice-forming member 17. The through hole 16a is formed in the second orifice-forming member 16 on one side of a partition 27a provided in a part of the lower orifice 27, and a through hole 17a is formed in the third orifice-forming member 17 on the other side of the partition 27a. The lower orifice 27 is therefore formed along an almost complete circumference from the through hole 16a of the second orifice-forming member 16 to the through hole 17a of the third orifice-forming member 17 (FIG. 3).

That is to say, the first liquid chamber 24 and the second liquid chamber 25 communicate with each other via the upper orifice 26 and the lower orifice 27 that are connected to each other in tandem.

To the caulking fixing part 13a of the outer tube 13 is fixed an annular mounting bracket 28 for fixing the active vibration isolation support system M to the vehicle body frame F, and to the lower face of the mounting bracket 28 is welded an actuator housing 30 forming an outer shell of the actuator 29 for driving the movable member 20.

To the actuator housing 30 is fixed a yoke 32, and an annular coil 34 wound around a bobbin 33 is housed in a space surrounded by the actuator housing 30 and the yoke 32. A bottomed cylinder-shaped bearing 36 is inserted from beneath into a tubular part 32a of the yoke 32, the tubular part 32a being fitted in the inner periphery of the annular coil 34, and is positioned by a retaining part 36a at the lower end of the bearing 36 being engaged with the lower end of the yoke 32. A disc-shaped armature 38 that faces the upper face of the coil 34 is slidably supported on the inner periphery of the actuator housing 30, and a step 38a formed on the inner periphery of the armature 38 engages with the upper end of the bearing 36. The armature 38 is forced upward by a dish spring 42 that is disposed between the armature 38 and the upper face of the coil 34, and is positioned by being engaged with a retaining part 30a provided on the actuator housing 30.

A cylindrical slider 43 is slidably fitted on the inner periphery of the bearing 36, and a shaft 20a extending downward from the movable member 20 runs loosely through the upper base of the bearing 36 and is connected to a boss 44 that is fixed to the interior of the slider 43. A coil spring 41 is positioned between the upper base of the bearing 36 and the slider 43, the bearing 36 being forced upward by the coil spring 41 and the slider 43 being forced downward thereby.

A lift sensor Sd provided beneath the actuator 29 includes a sensor housing 45 that is fixed to the lower end of the actuator housing 30. A sensor rod 47 is slidably supported in a guide member 46 that is fixed to the interior of the sensor housing 45, and forced upward by means of a coil spring 48 disposed between the sensor rod 47 and the base of the sensor housing 45 so as to be in contact with the boss 44 of the slider 43. A contact point 50 that is fixed to the sensor rod 47 is in contact with a resistor 49 that is fixed to the interior of the sensor housing 45. The electrical resistance between the lower end of the resistor 49 and the contact point 50 is input into the electronic control unit U via a connector 51. Since the lift of the movable member 20 is equal to the travel of the contact point 50, the lift of the movable member 20 can be detected based on the electrical resistance.

When the coil 34 of the actuator 29 is in a demagnetized state, the coil spring 41 applies a downward elastic force to the slider 43 slidably supported on the bearing 36, the coil spring 48 applies an upward elastic force thereto via the sensor rod 47 and the boss 44, and the slider 43 therefore comes to rest at a position where the elastic forces of the two coil springs 41 and 48 are in balance. When the coil 34 is energized from the above-mentioned state so as to draw the armature 38 downward, the step 38a pushes the bearing 36 making it slide downward so compressing the coil spring 41. As a result, the elastic force of the coil spring 41 increases so lowering the slider 43, the movable member 20 that is connected to the slider 43 via the boss 44 and the shaft 20a therefore descends, and the second elastic body that is connected to the movable member 20 deforms downward so increasing the capacity of the first liquid chamber 24. Conversely, when the coil 34 is demagnetized, the movable member 20 rises, the second elastic body 18 deforms upward and the capacity of the first liquid chamber 24 decreases.

When a low frequency engine shake vibration occurs while the automobile is traveling, a load that is input from the engine E deforms the first elastic body 14 so changing the capacity of the first liquid chamber 24, and as a result the liquid travels to and fro between the first liquid chamber 24 and the second liquid chamber 25, which are connected to each other via the upper orifice 26 and the lower orifice 27. When the capacity of the first liquid chamber 24 increases and decreases, the capacity of the second liquid chamber 25 decreases and increases accordingly, and this change in the capacity of the second liquid chamber 25 is absorbed by elastic deformation of the diaphragm 22. Since the shapes and dimensions of the upper orifice 26 and the lower orifice 27 and the spring constant of the first elastic body 14 are set so that a high spring constant and a high attenuation force can be obtained in a region including the above-mentioned frequency of the engine shake vibration, the vibration that is transmitted from the engine E to the vehicle body frame F can be reduced effectively.

In the above-mentioned frequency region of engine shake vibration the actuator 29 is maintained in a non-operational state.

When vibration occurs having a frequency that is higher than that of the above-mentioned engine shake vibration, that is to say, when idling vibration or muffled sound vibration due to rotation of the crankshaft of the engine E occurs, since the liquid within the upper orifice 26 and the lower orifice 27 that provide communication between the first liquid chamber 24 and the second liquid chamber 25 becomes stationary and cannot exhibit the vibration isolation function, the actuator 29 is operated so as to exhibit the vibration isolation function.

The electronic control unit U controls the application of current to the coil 34 of the actuator 29 based on the signals from the engine rotational speed sensor Sa, the load sensor Sb, the acceleration sensor Sc and the lift sensor Sd. More specifically, when the engine E is biased downward due to the vibration and the capacity of the first liquid chamber 24 thereby decreases so increasing the liquid pressure, the armature 38 is drawn in by energizing the coil 34. As a result, the armature 38 moves downward together with the movable member 20 while compressing the coil spring 41, thus deforming downward the second elastic body 18 that is connected to the inner periphery of the movable member 20. The capacity of the first liquid chamber 24 thereby increases so suppressing the increase in the liquid pressure, and the active vibration isolation support system M thus generates an active support force to prevent transmission of the downward load from the engine E to the vehicle body frame F.

Conversely, when the engine E is biased upward due to the vibration and the capacity of the first liquid chamber 24 thus increases so decreasing the liquid pressure, the drawing-in of the armature 38 is canceled by demagnetizing the coil 34. As a result, the armature 38 moves upward together with the movable member 20 due to the elastic force of the coil spring 41, thus deforming upward the second elastic body 18 that is connected to the inner periphery of the movable member 20. The capacity of the first liquid chamber 24 thereby decreases so suppressing the decrease in the liquid pressure, and the active vibration isolation support system M thus generates an active support force to prevent transmission of the upward load from the engine E to the vehicle body frame F.

The electronic control unit U compares the actual lift of the movable member 20 that has been detected by the lift sensor Sd with the target lift thereof that has been calculated based on the outputs from the engine rotational speed sensor Sa, the load sensor Sb and the acceleration sensor Sc, and the operation of the actuator 29 is feedback controlled so that the deviation converges to 0.

Now, according to the primary aspect of the invention, a method of controlling the drive of the actuator 29 of the active vibration isolation support system M is described with reference to FIG. 5. Specifically, when the target lift of the actuator 29 is in a sinusoidal form having a fixed cycle, a large number of consecutive micro time regions are set, and duty control of the voltage that is applied to the actuator 29 is carried out in each of the micro time regions. In the present embodiment, fourteen micro time regions together form one cycle for the lift of the actuator 29, and duty control of the voltage that is applied to the actuator 29 is carried out individually in each of the fourteen micro time regions. Of course, the large number of micro time regions used according to the invention is not limited to fourteen, as in the foregoing example, but may be a lesser or greater number depending on the desired or appropriate cycle of the lift for the actuator in a given situation.

Figure 5:
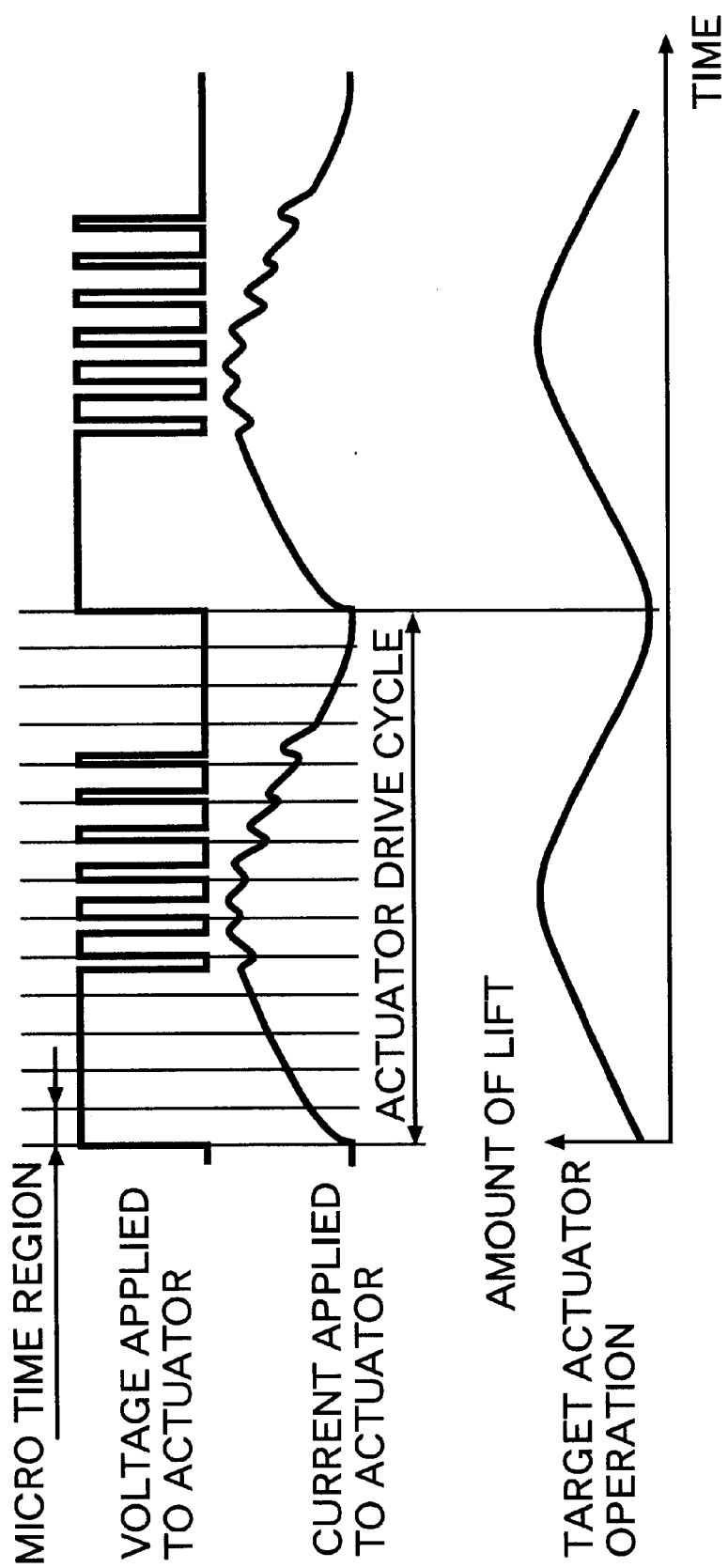
FIG. 5 is a diagram showing a method for controlling an actuator according to an embodiment of the invention.

More specifically, in the example of FIG. 5, the duty ratios of the first four micro time regions are set at 100%, the duty ratios of the subsequent seven micro time regions are decreased gradually from 100% to 0%, and the duty ratios of the last three micro time regions are set at 0%. As a result, the lift of the actuator 29 can be obtained as a sinusoidal wave form with 14 micro time regions in a single cycle. Decreasing the number of consecutive micro time regions whose duty ratios change with a defined pattern from the above-mentioned number of 14 can shorten the cycle over which the lift changes. Conversely, increasing the number of consecutive micro time regions whose duty ratios change with a defined pattern from the above-mentioned number of 14 can lengthen the cycle of the lift. Furthermore, changing the pattern of the duty ratios of a plurality of micro time regions forming one period in various ways can freely control the waveform of the lift of the actuator 29.

Figure 6:
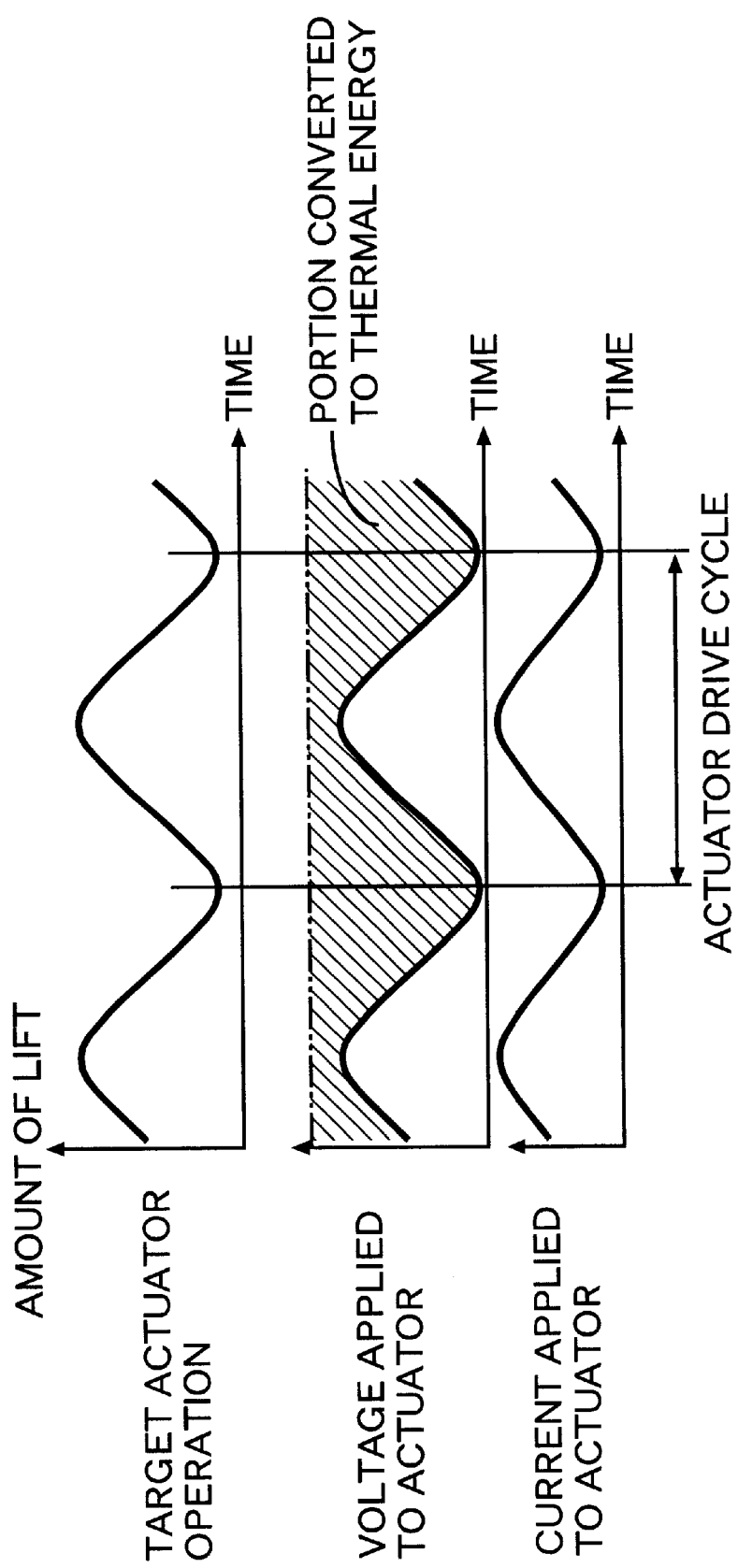
FIG. 6 is a diagram showing a conventional method for controlling an actuator.

Moreover, unlike the conventional example illustrated in FIG. 6, since it is unnecessary to regulate a proportion of the voltage that is applied to the actuator 29 in a driver so as to convert it to thermal energy, the problems of cooling a hot driver and wasting part of the electrical energy so increasing the power consumption can be eliminated.

As hereinbefore described, in accordance with the invention described in conjunction with the disclosed embodiment, by carrying out duty control of the voltage that is applied to the actuator individually in each of the large number of consecutive micro time regions, the waveform of current that is applied to the actuator, that is to say, the waveform of the lift of the actuator can be set freely and, moreover, by changing the number of consecutive micro time regions in which changes of the duty ratio form a defined pattern, the period of the current that drives the actuator, that is to say, the period of the lift of the actuator can be set freely. Furthermore, since electrical energy is not wasted as thermal energy in the actuator driver, the problems of heat being generated in the driver and the power consumption increasing can be avoided.

An embodiment of the present invention has been described in detail above, but the present invention can be modified in a variety of ways without departing from the spirit and scope of the invention.

For example, an active vibration isolation support system M supporting an engine E of an automobile is illustrated in the embodiment, but the active vibration isolation support system of the present invention can be applied to the support of another vibrating body such as a machine tool. The scope of the invention is indicated by the appended claims.

What is claimed is:

1. A method for controlling the drive of an actuator of an active vibration isolation support system that includes an elastic body receiving a load from a vibrating body, a liquid chamber having a wall of which at least a part is formed by the elastic body, a movable member which changes a capacity of the liquid chamber, and an electromagnetic actuator which drives the movable member, the method comprising the steps of:

setting a large number of consecutive micro time regions;

carrying out duty control of voltage that is applied to the actuator in each of the micro time regions; and setting, via a fixed number of consecutive micro time regions in which changes of duty ratio form a defined pattern, a period of a current that drives the actuator, wherein said fixed number of said consecutive micro time regions are used to form said defined pattern, thereby to form a single operational cycle of the electromagnetic actuator.

2. The method according to claim 1, wherein said duty control of voltage that is applied to the actuator is carried out individually in each of said micro time regions.

3. The method according to claim 1, wherein said duty control of voltage that is applied to the actuator is freely controlled in each of said micro time regions to define a wave form of lift of said actuator.

4. The method according to claim 3, wherein said wave form is sinusoidal.

5. The method according to claim 1, wherein said fixed number of micro time regions is set according to a desired period of lift of the actuator.

6. The method according to claim 1, wherein said vibrating body is an engine, and said step of carrying out duty control of the voltage that is applied to the actuator involves feed back control based on actual lift of the actuator and target lift of the actuator determined from engine rotational speed, load input to said active vibration isolation support system, and acceleration acting on the engine.

7. The method according to claim 1, wherein the voltage that is applied to the actuator is unregulated.

8. A method for controlling the drive of an actuator of an active vibration isolation support system that includes an elastic body receiving a load from a vibrating body, a liquid chamber having a wall of which at least a part is formed by the elastic body, a movable member which changes a capacity of the liquid chamber, and an electromagnetic actuator which drives the movable member, the method comprising the steps of:

determining an appropriate drive cycle and wave form of lift for said actuator;

setting a number of consecutive micro time regions corresponding to a period of said drive cycle;

carrying out duty control of voltage that is applied to the actuator individually in each of said consecutive micro time regions such that changes of duty ratio form a defined pattern corresponding to said wave form; and wherein said set number of said consecutive micro time regions are used to form said defined pattern, thereby to form a single operational cycle of the electromagnetic actuator.

9. The method according to claim 8, wherein said wave form is sinusoidal.

10. The method according to claim 8, wherein said number of consecutive micro time regions is large.

11. The method according to claim 8, wherein said vibrating body is an engine, and said step of carrying out duty control of the voltage that is applied to the actuator involves feed back control based on actual lift of the actuator and target lift of the actuator determined from engine rotational speed, load input to said active vibration isolation support system, and acceleration acting on the engine.

12. The method according to claim 8, wherein the voltage that is applied to the actuator is unregulated.

* * * * *